(12) United States Patent
Schager et al.

(10) Patent No.: US 11,830,115 B2
(45) Date of Patent: Nov. 28, 2023

(54) DYNAMIC 3D EYELASH ATTACHMENT

(71) Applicant: Lemon Inc., Grand Cayman (KY)

(72) Inventors: Nathan Schager, Los Angeles, CA (US); Maryyann Crichton, Culver City, CA (US); Jefrain Gallipoli, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/520,487

(22) Filed: Nov. 5, 2021

(65) Prior Publication Data

US 2023/0143645 A1  May 11, 2023

(51) Int. Cl.
| | |
|---|---|
| *G06T 11/60* | (2006.01) |
| *G06T 17/20* | (2006.01) |
| *G06T 1/60* | (2006.01) |
| *G06T 19/00* | (2011.01) |
| *G06V 40/18* | (2022.01) |
| *A41G 5/02* | (2006.01) |

(52) U.S. Cl.
CPC .............. *G06T 1/60* (2013.01); *G06T 17/20* (2013.01); *G06T 19/006* (2013.01); *G06V 40/193* (2022.01); *A41G 5/02* (2013.01)

(58) Field of Classification Search
None
See application file for complete search history.

(56) References Cited

U.S. PATENT DOCUMENTS

| | | | |
|---|---|---|---|
| 11,069,094 B1* | 7/2021 | Evangelista | G06T 11/60 |
| 2013/0113832 A1* | 5/2013 | Toyoda | G06T 11/203 |
| | | | 345/641 |
| 2019/0274614 A1* | 9/2019 | Aginsky | A61B 5/7246 |

FOREIGN PATENT DOCUMENTS

| | | |
|---|---|---|
| CN | 109993689 A | 7/2019 |
| CN | 113838189 A | 12/2021 |

OTHER PUBLICATIONS

International Search Report dated Jun. 7, 2023 for International Application No. PCT/SG2022/050757.

* cited by examiner

*Primary Examiner* — Tapas Mazumder
(74) *Attorney, Agent, or Firm* — Faegre Drinker Biddle & Reath LLP

(57) ABSTRACT

Systems and methods directed to rendering a dynamic eyelash attachment to an eye identified in a video are described. In examples, a dynamic eyelash template may be applied to a video, where the dynamic eyelash template configures an eyelash skeleton that includes eyelash skeleton branches. Further, the video with one or more video frames may be received such that eye keypoints associated with a shape of the eye in the video frames can be identified. Accordingly, the eyelash skeleton branches may be attached to areas corresponding to eye keypoints based on the dynamic eyelash template. A three-dimensional rotation of the eyelash skeleton branches may be configured to conform to the shape of the eye defined by the eye keypoints during an eye movement. Thus, a dynamic effect can be added to the eyelash skeleton to allow the eyelash skeleton branches to rotate and bounce during the eye movement.

17 Claims, 10 Drawing Sheets

DYNAMIC 3D EYELASH ATTACHMENT

BACKGROUND

Video editing techniques are available to provide users various way to add visual effects to live videos. However, many of the video editing techniques do not consider rendering the visual effect individually tailored to particular face features of the user, thereby providing poor augmented reality effects. Hence, there remains a need to develop video editing techniques for rendering video effect synchronizations to enhance the user experience.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, a method for rendering a dynamic eyelash attachment to an eye. The method may include: receiving a dynamic eyelash template selected by a user to be applied to a video, the dynamic eyelash template configuring an eyelash skeleton including eyelash skeleton branches, receiving the video with one or more video frames, identifying eye keypoints associated with a shape of the eye in each of the one or more video frames, attaching the eyelash skeleton branches to corresponding eye keypoints based on the dynamic eyelash template, setting a three-dimensional rotation of the eyelash skeleton branches to conform to the shape of the eye defined by the eye keypoints during an eye movement and adding a dynamic effect to the eyelash skeleton to allow the eyelash skeleton branches to rotate and bounce during the eye movement.

In accordance with at least one example of the present disclosure, a computing device for rendering a dynamic eyelash attachment is described. The computing device comprises a processor and a memory having a plurality of instructions stored thereon that, when executed by the processor, causes the computing device to: receiving a dynamic eyelash template selected by a user to be applied to a video, the dynamic eyelash template configuring an eyelash skeleton including eyelash skeleton branches, receive the video with one or more video frames, identify eye keypoints associated with a shape of the eye in each of the one or more video frames, attach the eyelash skeleton branches to corresponding eye keypoints based on the dynamic eyelash template, set a three-dimensional rotation of the eyelash skeleton branches to conform to the shape of the eye defined by the eye keypoints during an eye movement, and add a dynamic effect to the eyelash skeleton to allow the eyelash skeleton branches to rotate and bounce during the eye movement.

In accordance with at least one example of the present disclosure, a non-transitory computer-readable medium storing instructions for rendering a dynamic eyelash attachment is described. The instructions, when executed by one or more processors of a computing device, cause the computing device to: receive video with one or more video frames, identify eye keypoints associated with a shape of an eye in each of the one or more video frames, attach eyelash skeleton branches to corresponding eye keypoints based on a dynamic eyelash template, set a three-dimensional rotation of the eyelash skeleton branches to conform to a shape of the eye defined by the eye keypoints during an eye movement, and add a dynamic effect to the eyelash skeleton to allow the eyelash skeleton branches to rotate and bounce during the eye movement.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a dynamic eyelash attachment system allows a user to attach 3D augmented reality eyelashes (e.g., eyelash skeleton branches) to a person's eye in a video, where the video may be a live video or a recorded video. To do so, the keypoints of the person's eye are identified using a face detection algorithm. The keypoints follow the shape of the person's eye and indicate attachment or anchor points for the eyelash skeleton branches. As such, attaching the eyelashes to the keypoints of the eye allows the eyelashes to be closely molded to the shape of the person's eye. In use, the user may choose an eyelash template from an eyelash template library to add three-dimensional (3D) augmented reality eyelashes to a person's eyes in the video. Each eyelash template includes predefined parameters that configure features of lashes. For example, the parameters may include, but are not limited to, damping, elasticity, stiffness, inertia, radius, and force associated with the eyelash skeleton branches. Once the eyelash skeleton is attached to the keypoints of the eye, the movements of eyelash skeleton branches may be dynamically adjusted based on the parameters to allow the 3D eyelash to rotate and bounce around during the eye movement (e.g., blink). In examples, bounce may refer to rebound or reflection when the 3D eyelash encounters and upper movement limit or a lower movement limit. For example, as a 3D eyelash moves based on a keypoint, upon reaching an upper limit, such as when an eye is open, one or more of the parameters of damping, elasticity, stiffness, inertia, radius, and force may affect whether the 3D eyelash rebounds (e.g., appears to bounce or change direction from an upward direction to a downward direction).

Figure 1:
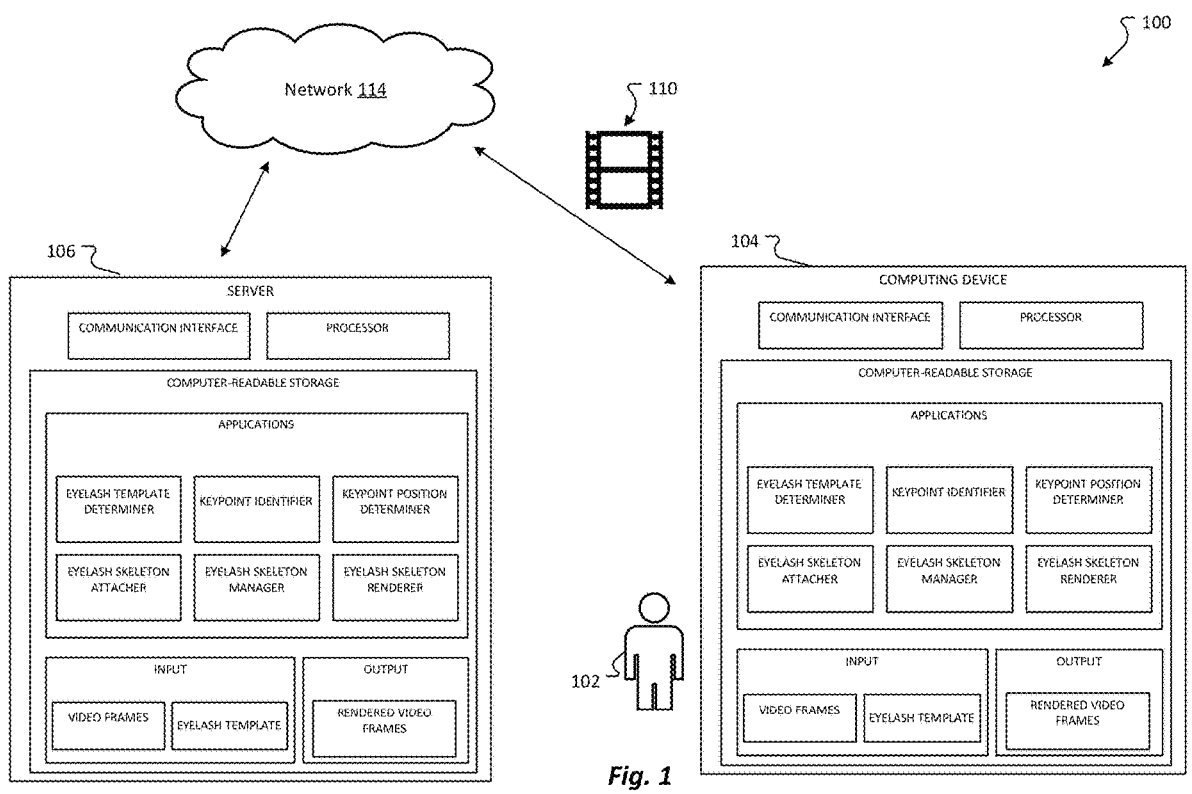
FIG. 1 depicts an example dynamic eyelash attachment system in accordance with examples of the present disclosure.

FIG. 1 depicts a dynamic eyelash attachment system 100 for rendering one or more video effects in accordance with examples of the present disclosure. For example, in the illustrative example, a user 102 may indicated that a dynamic eyelash template is to be applied to a video, where the video may be a live video or a recorded video. It should be appreciated that, in some examples, the eyelash attachment effect may be applied to a video clip that was received, acquired, or otherwise obtained by the computing device 104. To do so, the dynamic eyelash attachment system 100 includes a computing device 104 associated with the user 102 and a server 106 that is communicatively coupled to the computing device 104 via a network 114. The network 114 may include any kind of computing network including, without limitation, a wired or wireless local area network (LAN), a wired or wireless wide area network (WAN), and/or the Internet.

In examples, the user 102 may utilize the computing device 104 to acquire the video clip 110. The user 102 may generate the video clip 110 using a camera communicatively coupled to a computing device 104. In such an example, the augmented reality eyelash effect may be applied to the video in or near real-time to allow the user 102 to view the eyelash effect as the user 102 is taking the video on the computing device 104. Alternatively, in some examples, the user 102 may receive, acquire, or otherwise obtain the video clip 110 on the computing device 104. In some aspects, the user 102 may utilize the computing device 104 to transmit the video clip 110 to the server 106 via the network 114. The computing device 104 may be any one of a portable or non-portable computing device. For example, the computing device 104 may be a smartphone, a laptop, a desktop, a server. The video clip 110 may be acquired in any format and may be in a compressed and/or decompressed form.

The computing device 104 is configured to determine which eyelash template has been selected by a user (e.g., 102) to be applied to a video to generate an augmented reality effect on the video, where the video may be a live video and the augmented reality effect is applied in real-time to the live video. The dynamic eyelash template configures an augmented reality 3-dimensional (3D) eyelash skeleton that includes multiple eyelash branches. Specifically, the eyelash template may indicate one or more styles (e.g., a length, color, thickness, and/or shape of features) of eyelashes. Additionally, the computing device 104 is configured to receive an indication from the user when to apply the selected eyelash template to a video. For example, the computing device 104 may receive the indication from the user via an input device (e.g. a physical keypad, a physical button, a soft keypad or icon generated on a touch screen display of the computing device) that is communicatively coupled to the computing device. In other example, the computing device 104 may determine that the indication has been received in response to detecting a start of a video.

Figure 3:
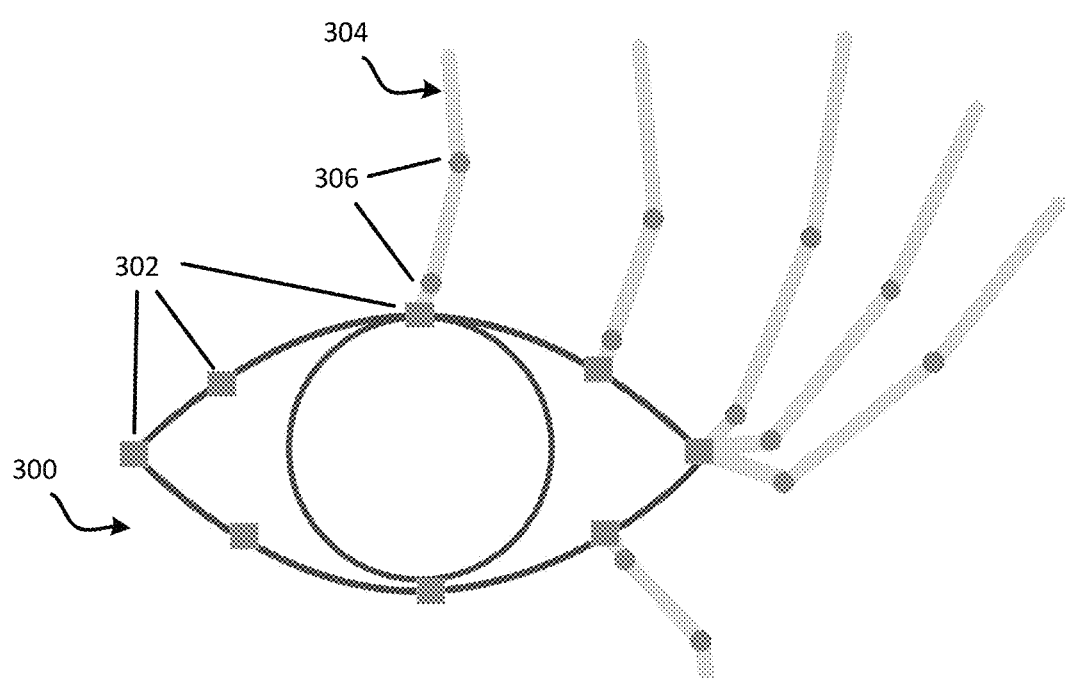
FIG. 3 depicts an example eye with eyelash skeleton branches.

Additionally, the computing device 104 is configured to analyze each frame of the video clip 110 to identify eye keypoints around each eye using a face detection algorithm. For example, as shown in FIG. 3, a face detection algorithm may identify eight (8) eye keypoints for each eye. The eye keypoints specify attachment or anchor points for the eyelash skeleton branches. Subsequently, the computing device 104 is configured to determine 3D positions of the eye keypoints. To do so, the computing device 104 may determine a position of each eye keypoint in screen space of the corresponding video frame. It should be appreciated that the screen space is the space defined by a display screen of the computing device, and the position or coordinate in the screen space are in 2D (i.e., 2D eye keypoints). In some examples, the screen space may refer to a window displayed at a display of the computing device, where the position or coordinate in the window are in 2D (i.e., 2D eye keypoints). Additionally, the computing device 104 is configured to estimate a depth of each eye keypoint by transforming the 2D eye keypoint to a 3D eye keypoint. To do so, the computing device 104 may place empty 3D points around the eye area to determine a rough depth of each eye keypoint on the eye. Moreover, the computing device 104 is configured to identify a 3D position of each eye keypoint based on the 2D eye keypoint and the depth information for each eye keypoint. Based on the 3D positions of eye keypoint, the computing device 104 is configured to set a root point of each of the corresponding eyelash branches of the eyelash skeleton. In the illustrative example, the 3D eye keypoints specify the root points of the eyelash skeleton branches for eyelash skeleton branches attachment.

Moreover, the computing device 104 is configured to attach roots of the eyelash skeleton branches to the corresponding 3D eye keypoints or root points based on the selected eyelash template. This allows the eyelash skeleton of the selected dynamic eyelash template to conform to the shape of the subject's eye and, thus, fit many different eye shapes. Additionally, in some examples, the computing device 104 may be configured to easily replace the selected dynamic eyelash template with another dynamic eyelash template using the identified 3D eye keypoints. The computing device 104 is further configured to determine a blink rotation of the eyelash skeleton branches based on a distance ratio between 3D positions of eye keypoints. For example, the computing device 104 may be configured to determine a distance between the left-right and top-bottom 3D positions of eye keypoints to determine the blink rotation of the eyelashes (i.e., the eyelash skeleton branches). For example, if a ratio between a vertical distance (left-right) and a horizontal distance (top-bottom) is small, then the computing device 104 may determine that a blink is not detected. If, however, the ratio between a vertical distance (left-right) and a horizontal distance (top-bottom) is large, then the computing device 104 may determine that a blink of a corresponding eye is detected. In response to the blink detection, the computing device 104 is configured to set a rotation of the eyelash skeleton branches based on the 3D positions of eye keypoints.

In addition, the computing device 104 may be further configured to customize the 3D eyelash skeleton by adding eyelash joints to the eyelash skeleton to achieve a more realistic augmented reality effect of the 3D eyelashes. For example, the eyelash joints may include keypoint joints and dynamic joints. The computing device 104 is configured to attach the keypoint joints to the positions of the 3D eye keypoints without physics simulation. It should be appreciated that the keypoint joints are adapted to serve as a parent roots of the dynamic joints hierarchy. Additionally, the computing device 104 is configured to attach one or more dynamic joints to the 3D eyelash skeleton branches with physics simulation. To control the physics simulation, the computing device 104 may further adjust the movements of eyelash skeleton branches based on one or more parameters associated with the eyelash skeleton. The parameters associated with the dynamic joints include, but are not limited to, damping, elasticity, stiffness, inertia, radius, and force associated with the eyelash skeleton branches. In other words, dynamically adjusting the movements of dynamic joints 306 allows the 3D eyelashes to rotate and bounce around during the blink of the eye. In examples, bounce may refer to rebound or reflection when the 3D eyelash encounters and upper movement limit or a lower movement limit. For example, as a 3D eyelash moves based on a keypoint, upon reaching an upper limit, such as when an eye is open, one or more of the parameters of damping, elasticity, stiffness, inertia, radius, and force may affect whether the 3D eyelash rebounds (e.g., appears to bounce or change direction from an upward direction to a downward direction).

The computing device 104 is configured to generate a 3D eyelash mesh for each eye for the eyelash skeleton branches and apply the 3D eyelash mesh to the user's video, where the video may be a live or recorded video. Subsequently, the computing device 104 may present the rendered video with the 3D eyelash effect to the user on the display screen in or near real-time.

Figure 2:
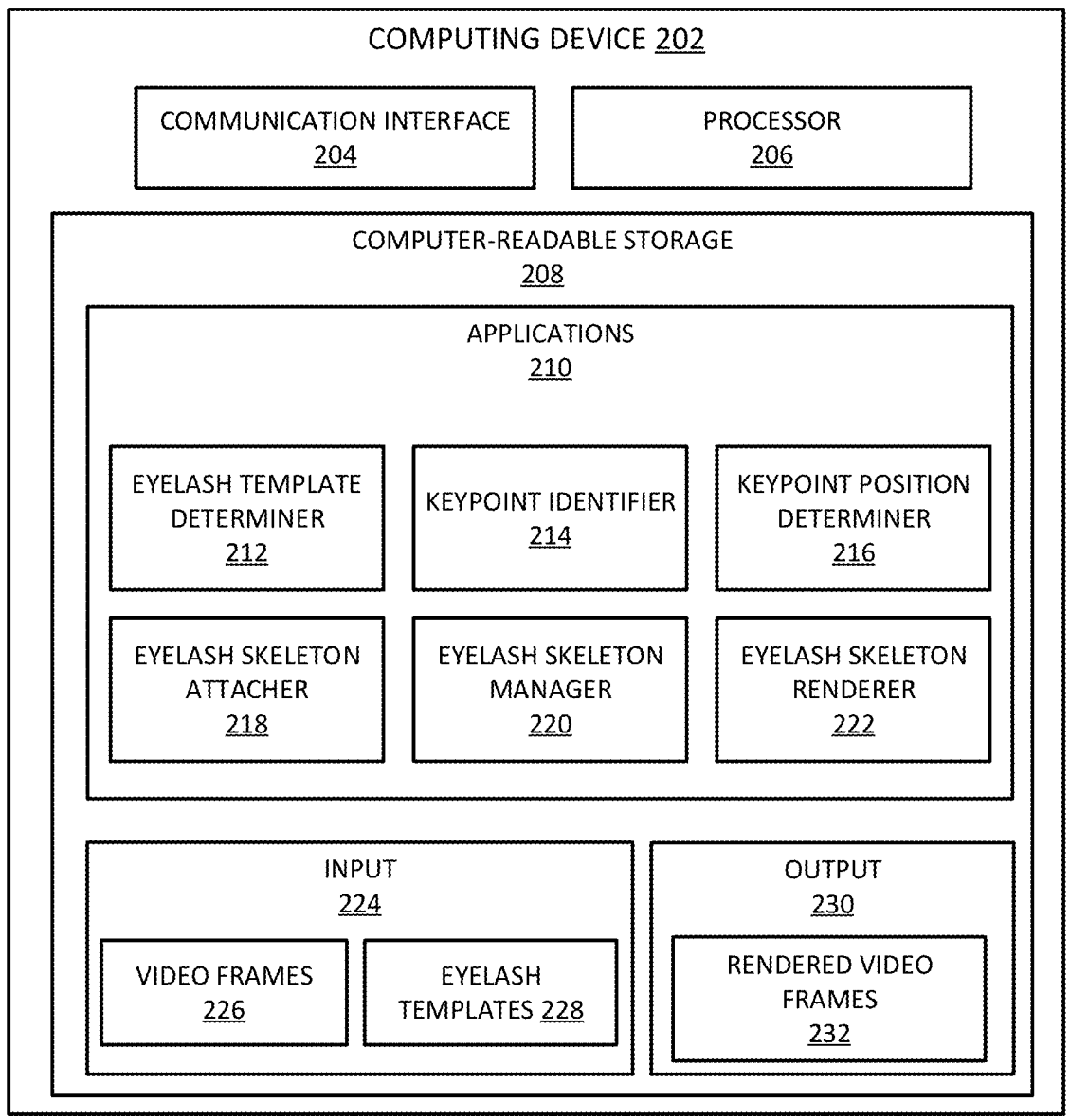
FIG. 2 depicts details of a computing device of the dynamic eyelash attachment system of FIG. 1 in accordance with examples of the present disclosure.

Referring now to FIG. 2, the computing device 202 in accordance with examples of the present disclosure is described. The computing device 202 may be the same as or similar to the computing device 104 previously described in FIG. 1. The computing device 202 may include a communication interface 204, a processor 206, and a computer-readable storage 208. In examples, the communication interface 204 may be coupled to a network and receive the video clip 110 (FIG. 1) and eyelash templates 228. The video clip 110 (FIG. 1) may be stored as video frames 226. In some examples, one or more eyelash video effects may also be received at the communication interface 204 and stored as the eyelash template 228. The eyelash template 228 may include one or more video effect parameters associated with the dynamic joints of the 3D eyelash skeleton. The parameters associated with the dynamic joints include, but are not limited to, damping, elasticity, stiffness, inertia, radius, and force associated with the eyelash skeleton branches.

In examples, one or more applications 210 may be provided by the computing device 104. The one or more applications 210 may include an eyelash template determiner 212, a keypoint identifier 214, a keypoint position determiner 216, an eyelash skeleton attacher 218, an eyelash skeleton manager 220, and an eyelash skeleton renderer 222.

The eyelash template determiner 212 is configured to determine which eyelash template has been selected by a user (e.g., 102) to be applied to a video to generate an augmented reality effect on the video, where the video may be a live video and the augmented reality effect may be applied in real-time. The dynamic eyelash template defines an augmented reality 3-dimensional (3D) eyelash skeleton that includes multiple eyelash branches. Specifically, the eyelash template may indicate one or more styles (e.g., a length, color, thickness, and/or shape of features) of eyelashes. Additionally, the eyelash template determiner 212 is configured to receive an indication from the user indicating when to apply the selected eyelash template to a video. For example, the eyelash template determiner 212 may receive the indication from the user via an input device (e.g. a physical keypad, a physical button, a soft keypad or icon generated on a touch screen display of the computing device) that is communicatively coupled to the computing device. In other example, the eyelash template determiner 212 may determine that the indication has been received in response to detecting a start of a video.

The keypoint identifier 214 is configured to identify eye keypoints around each eye in a video frame using a face detection algorithm. For example, as shown in FIG. 3, a face detection algorithm may identify eight (8) eye keypoints for each eye. The eye keypoints identify attachment or anchor points for the eyelash skeleton branches.

The keypoint position determiner 216 is configured to determine 3D positions of the eye keypoints. To do so, the keypoint position determiner 216 first determines a position of each eye keypoint in screen space of the corresponding video frame. It should be appreciated that the screen space is the space defined by a display screen of the computing device, and the position or coordinate in the screen space are in 2D. In other words, the keypoint position determiner 216 determines positions of 2D eye keypoints. In some examples, the screen space may refer to a window displayed at a display of the computing device, where the position or coordinate in the window are in 2D (i.e., 2D eye keypoints). Additionally, the keypoint position determiner 216 is configured to estimate a depth of each eye keypoint by transforming the 2D eye keypoint to a 3D eye keypoint. To do so, the keypoint position determiner 216 may place empty 3D points around the eye area to determine a rough depth of each eye keypoint on the eye. Moreover, the keypoint position determiner 216 is configured to identify a 3D position of each eye keypoint based on the 2D eye keypoint and the depth information for each eye keypoint. Based on the 3D positions of eye keypoint, the keypoint position determiner 216 is configured to set a root point of each of the corresponding eyelash branches of the eyelash skeleton. In the illustrative example, the 3D eye keypoints define the root points of the eyelash skeleton branches for eyelash skeleton branches attachment.

The eyelash skeleton attacher 218 is configured to attach roots of the eyelash skeleton branches to the corresponding 3D eye keypoints or root points based on the selected eyelash template. This allows the eyelash skeleton of the selected dynamic eyelash template to conform to the shape of the subject's eye and, thus, fit many different eye shapes. Additionally, in some examples, the eyelash skeleton attacher 218 may be configured to easily replace the selected dynamic eyelash template with another dynamic eyelash template using the identified 3D eye keypoints.

The eyelash skeleton manager 220 is configured to determine a blink rotation of the eyelash skeleton branches based on a distance ratio between 3D positions of eye keypoints. For example, the eyelash skeleton manager 220 may be configured to determine a distance between the left-right and top-bottom 3D positions of eye keypoints to determine the blink rotation of the eyelashes (i.e., the eyelash skeleton branches). For example, if a ratio between a vertical distance (left-right) and a horizontal distance (top-bottom) is small, then the eyelash skeleton manager 220 may determine that a blink is not detected. If, however, the ratio between a vertical distance (left-right) and a horizontal distance (top-bottom) is large, then the eyelash skeleton manager 220 may determine that a blink of a corresponding eye is detected. In response to the blink detection, the eyelash skeleton manager 220 is configured to set a rotation of the eyelash skeleton branches based on the 3D positions of eye keypoints.

In addition, the eyelash skeleton manager 220 may further be configured to customize the 3D eyelash skeleton by adding eyelash joints to the eyelash skeleton to achieve more realistic augmented reality effect of the 3D eyelashes. For example, the eyelash joints may include keypoint joints and dynamic joints. The eyelash skeleton manager 220 is configured to attach the keypoint joints to the positions of the 3D eye keypoints without physics simulation. It should be appreciated that the keypoint joints are adapted to serve as parent root of the dynamic joints hierarchy. Additionally, the eyelash skeleton manager 220 is configured to attach one or more dynamic joints to the 3D eyelash skeleton branches with physics simulation. To control the physics simulation, the eyelash skeleton manager 220 may further adjust the movements of eyelash skeleton branches based on one or more parameters associated with the eyelash skeleton. The parameters associated with the dynamic joints include, but are not limited to, damping, elasticity, stiffness, inertia, radius, and force associated with the eyelash skeleton branches. In other words, dynamically adjusting the movements of dynamic joints 306 allows the 3D eyelashes to rotate and bounce around during the blink of the eye. In examples, bounce may refer to rebound or reflection when the 3D eyelash encounters and upper movement limit or a lower movement limit. For example, as a 3D eyelash moves based on a keypoint, upon reaching an upper limit, such as when an eye is open, one or more of the parameters of damping, elasticity, stiffness, inertia, radius, and force may affect whether the 3D eyelash rebounds (e.g., appears to bounce or change direction from an upward direction to a downward direction).

The eyelash skeleton renderer 222 is configured to generate a 3D eyelash mesh for each eye for the eyelash skeleton branches. The eyelash skeleton renderer 222 is configured to apply the 3D eyelash mesh to the user's video, where the video may be a live or recorded video. Subsequently, the eyelash skeleton renderer 222 is configured to present the rendered video with the 3D eyelash effect to the user on the display screen in or near real-time.

FIG. 3 illustrates an exemplary eye 300 of a subject is shown. In the illustrative example, there are eight (8) eye keypoints 302 that define the shape of the eye and serve as root points of eyelash skeleton branches where each eyelash skeleton branch 304 is being attached to. As described above and further below, the rotational and translational movement of the eyelash skeleton branches 304 during the eye movement (e.g., blink) may be added to achieve more realistic augmented reality effect of the 3D eyelashes implementation. To do so, the eyelash joints may be added to the eyelash skeleton branches. In the illustrative example, the eyelash joints include keypoint joints 302 (shown in square) and dynamic joints 306 (shown in circle). For example, the keypoint joints 302 are configured to match the eye keypoints positions and are added without physics simulation. It should be appreciated that the keypoint joints 302 serve as parent root of the dynamic joints hierarchy. The dynamic joints 306 are added to the 3D eyelash skeleton branches 304 with physics simulation. As shown in FIG. 3, each eyelash skeleton branch 304 may include multiple dynamic joints 306. The physics simulation of the dynamic joints 306 may depend on one or more predefined parameters associated with the eyelash skeleton. The parameters may include, but are not limited to, damping, elasticity, stiffness, inertia, radius, and force associated with the eyelash skeleton branches. In other words, adjusting the movements of dynamic joints 306 allows the 3D eyelashes to rotate and bounce around during the blink of the eye. In examples, bounce may refer to rebound or reflection when the 3D eyelash encounters and upper movement limit or a lower movement limit. For example, as a 3D eyelash moves based on a keypoint, upon reaching an upper limit, such as when an eye is open, one or more of the parameters of damping, elasticity, stiffness, inertia, radius, and force may affect whether the 3D eyelash rebounds (e.g., appears to bounce or change direction from an upward direction to a downward direction).

Figure 4:
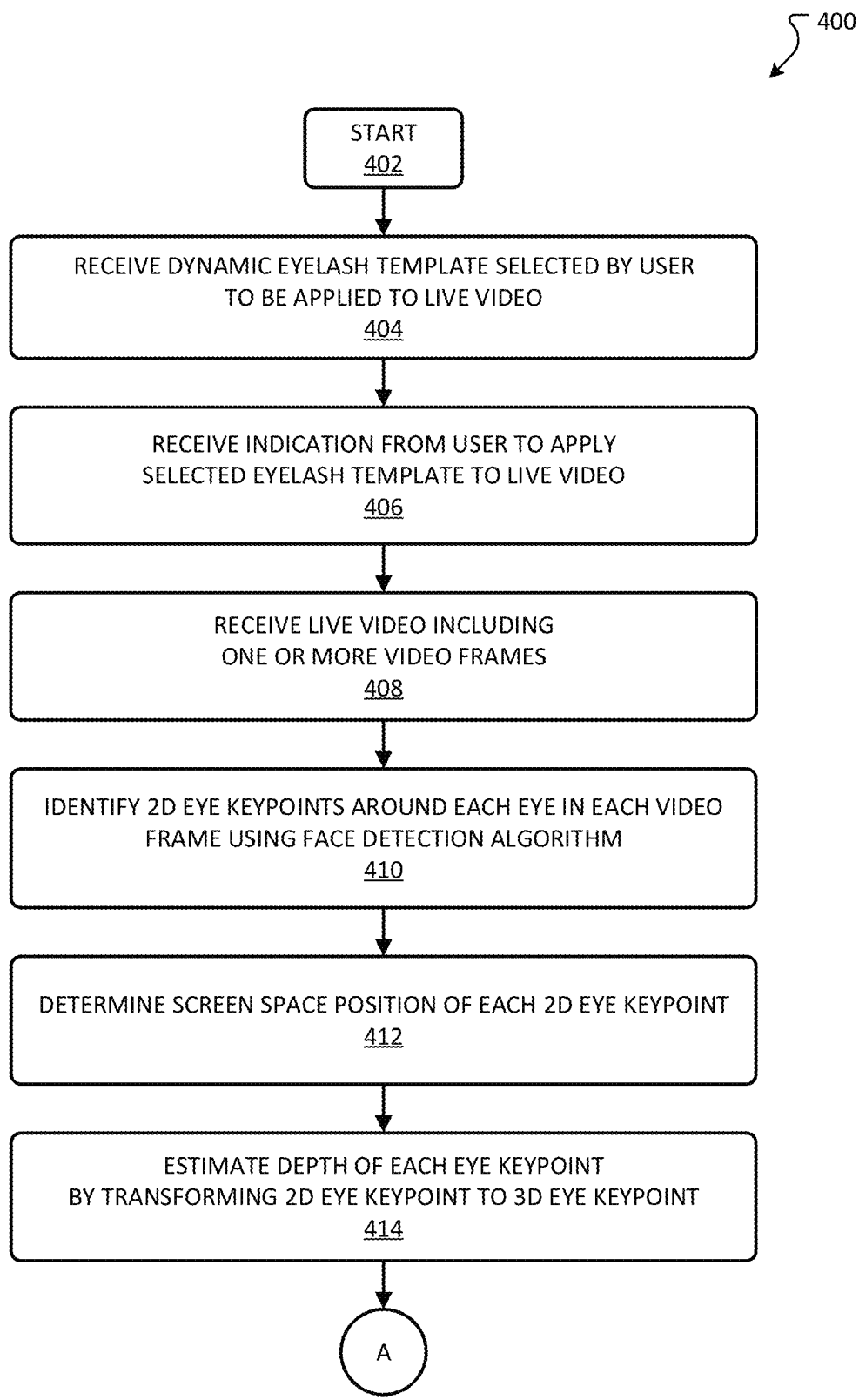
FIGS. 4-6 depict details of a method for rendering a dynamic eyelash attachment in accordance with examples of the present disclosure.

Referring now to FIG. 4, a simplified method for rendering dynamic eyelash attachment to video data in accordance with examples of the present disclosure is described. A general order for the steps of a method 400 is shown in FIG. 4. Generally, the method 400 starts at 402 and ends at 438. The method 400 may include more or fewer steps or may arrange the order of the steps differently than those shown in FIG. 4. The method 400 can be executed as a set of computer-executable instructions executed by a computer system and encoded or stored on a computer readable medium. In the illustrative aspect, the method 400 is executed by a computing device (e.g., 104) associated with a user (e.g., 102). However, it should be appreciated that aspects of the method 400 may be performed by one or more processing devices, such as a computer or server (e.g., 106). Further, the method 400 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1 and 2.

The method 400 starts at 402, where flow may proceed to 404. At operation 404, the computing device receives a dynamic eyelash template selected by a user (e.g., 102) to be applied to a video to generate an augmented reality effect on the video, where the video may be a live or recorded video and the augmented reality effect may be applied in real-time. The dynamic eyelash template defines an augmented reality 3-dimensional (3D) eyelash skeleton that includes multiple eyelash branches.

At operation 406, the computing device 104 receives an indication from the user to apply the selected eyelash template to the video. For example, the computing device may receive the indication from the user via an input device (e.g. a physical keypad, a physical button, a soft keypad or icon generated on a touch screen display of the computing device) that is communicatively coupled to the computing device. In other example, the computing device may determine that the indication has been received in response detecting a start of a video.

Subsequently, at operation 408, the computing device receives the video including one or more video frames. In some examples, the operation 406 may be performed subsequent to the operation 408. It should be appreciated that, in some examples, the operations 404 and 406 may be performed subsequent to the operation 408. In other words, the user may choose to apply the dynamic eyelash template to the video after the user starts the video.

At operation 410, as the video frames are being received, the computing device identifies 2D eye keypoints around each eye of a subject in each video frame using a face detection algorithm. For example, as shown in FIG. 3, a face detection algorithm may identify eight (8) eye keypoints for each eye.

Subsequently, at operation 412, the computing device determines a position of each eye keypoint in screen space. As described above, screen space is the space defined by a display screen of the computing device. In other words, the position or coordinate in the screen space are in 2D from zero-to-one depending on a screen position. In some examples, the screen space may refer to a window displayed at a display of the computing device, where the position or coordinate in the window are in 2D (i.e., 2D eye keypoints).

Figure 5:
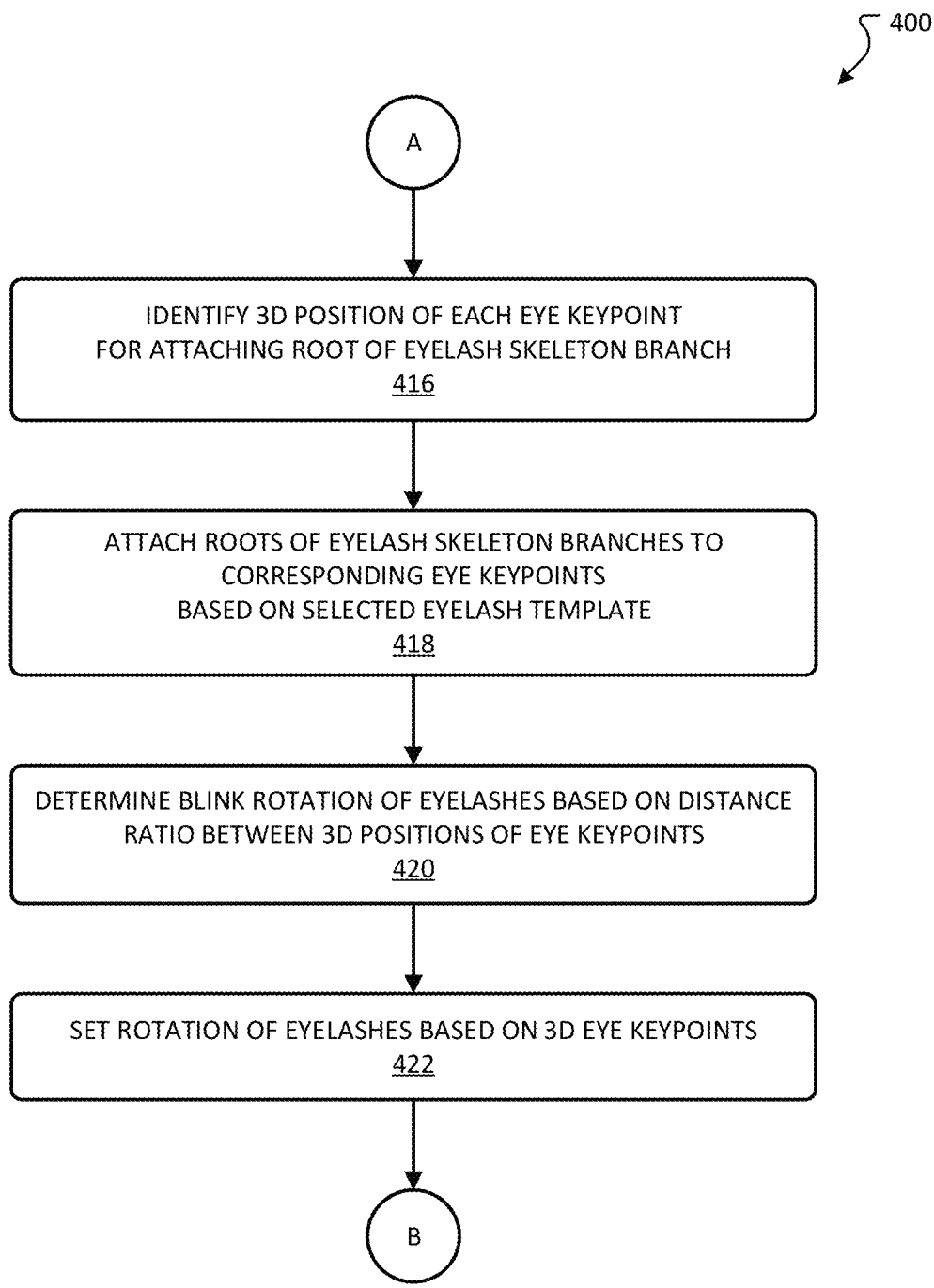

At operation 414, the computing device estimate a depth of each eye keypoint by transforming the 2D eye keypoint to a 3D eye keypoint. To do so, for example, empty 3D points may be placed around the eye area to determine a rough depth of each eye keypoint on the eye. Subsequently, the method 400 proceeds to 416 in FIG. 5 as shown by the alphanumeric character A in FIGS. 4 and 5.

At operation 416, the computing device identifies a 3D position of each eye keypoint based on the 2D eye keypoint and the depth information for each eye keypoint. Based on the 3D positions of eye keypoint, the computing device sets a root point of each of the corresponding eyelash branches of the eyelash skeleton. In the illustrative example, the 3D eye keypoints define the root points of the eyelash skeleton branches where each eyelash skeleton branch is being attached to.

At operation 418, the computing device attaches roots of the eyelash skeleton branches to the corresponding 3D eye keypoints or root points based on the selected eyelash template. This allows the eyelash skeleton of the selected dynamic eyelash template to conform to the shape of the subject's eye and, thus, fit many different eye shapes. Additionally, in some examples, the selected dynamic eyelash template may be replaced with another dynamic eyelash template using the identified 3D eye keypoints.

Figure 6:
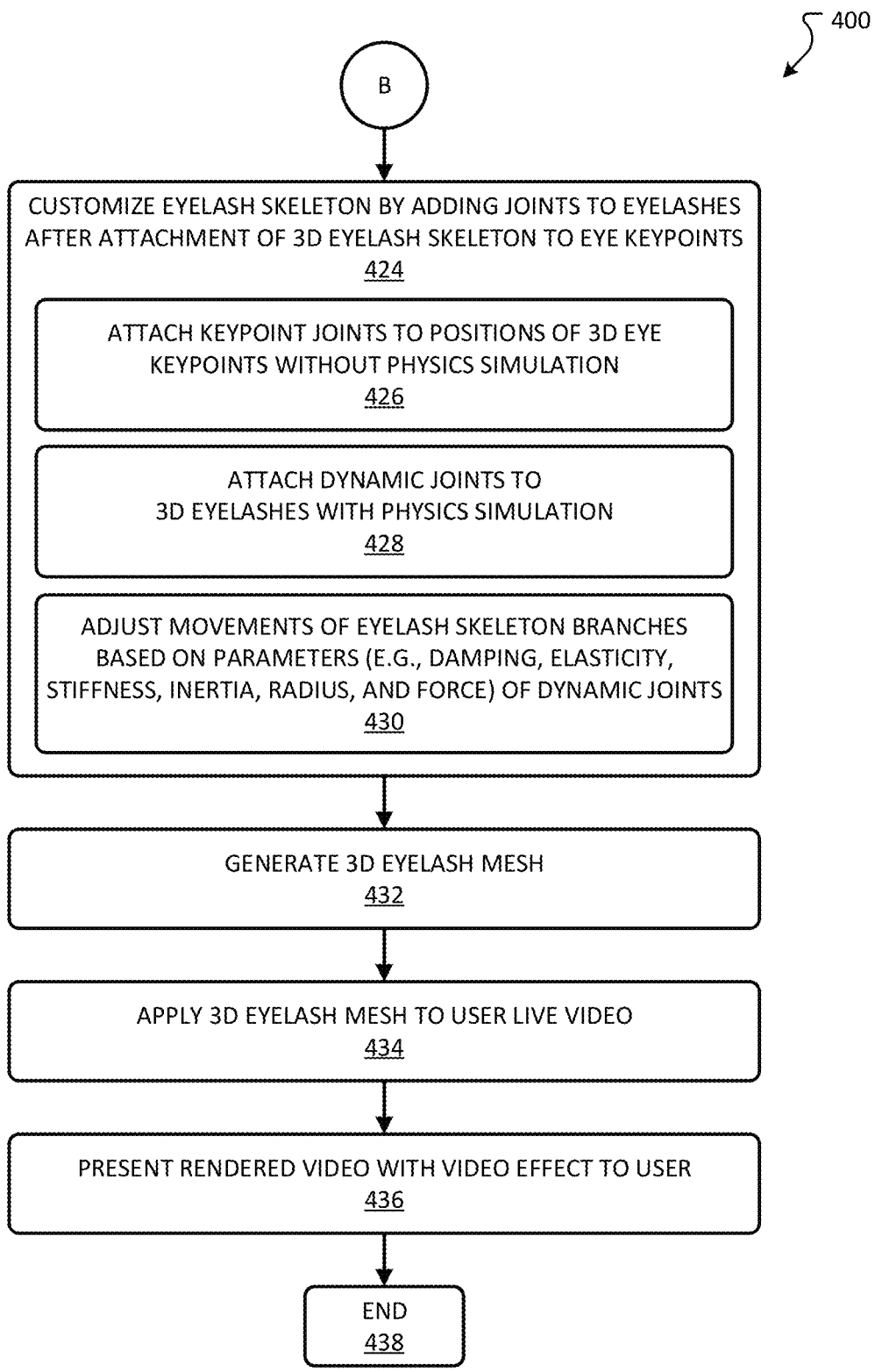

Subsequently, at operation 420, the computing device further determines a blink rotation of the eyelash skeleton branches based on a distance ratio between 3D positions of eye keypoints. To do so, the computing device may determine a distance between the left-right and top-bottom 3D positions of eye keypoints to determine the blink rotation of the eyelashes (i.e., the eyelash skeleton branches). For example, if a ratio between a vertical distance (left-right) and a horizontal distance (top-bottom) is small, then the computing device determines that a blink is not detected. If, however, the ratio between a vertical distance (left-right) and a horizontal distance (top-bottom) is large, then the computing device determines that a blink of a corresponding eye is detected. At operation 422, in response to determining the blink of the corresponding eye, the computing device sets a rotation of the eyelash skeleton branches based on the 3D positions of eye keypoints. Subsequently, the method 400 proceeds to 424 in FIG. 6 as shown by the alphanumeric character B in FIGS. 5 and 5.

At operation 424, subsequent to attaching the 3D eyelash skeleton to the 3D location of the eye keypoints, the computing device customizes the 3D eyelash skeleton by adding eyelash joints to the eyelash skeleton. In the illustrative example, the eyelash joints include keypoint joints and dynamic joints. For example, the computing device attaches the keypoint joints to the positions of the 3D eye keypoints without physics simulation, as indicated in operation 426. The keypoint joints serve as parent root of the dynamic joints hierarchy. Additionally, the computing device attaches the dynamic joints to the 3D eyelash skeleton branches with physics simulation, as indicated in operation 428. It should be appreciated that each eyelash skeleton branch may include multiple dynamic joints, as shown in FIG. 3.

At operation 430, the computing device adjusts movements of eyelash skeleton branches (e.g., physics simulation) based on one or more parameters associated with the dynamic joints. For example, the parameters include, but are not limited to, damping, elasticity, stiffness, inertia, radius, and force associated with the eyelash skeleton branches. In other words, the translational and rotational movements of the 3D eyelashes are adjusted based on the parameters of dynamic joints to allow the 3D eyelashes to rotate and bounce around during the eye movement (e.g., blink). In examples, bounce may refer to rebound or reflection when the 3D eyelash encounters and upper movement limit or a lower movement limit. For example, as a 3D eyelash moves based on a keypoint, upon reaching an upper limit, such as when an eye is open, one or more of the parameters of damping, elasticity, stiffness, inertia, radius, and force may affect whether the 3D eyelash rebounds (e.g., appears to bounce or change direction from an upward direction to a downward direction).

Subsequently, at operation 432, the computing device generates a 3D eyelash mesh for each eye for the eyelash skeleton branches. The 3D eyelash mesh is applied to the user's video, as indicated in operation 434.

At operation 436, the computing device presents the rendered video with the 3D eyelash effect to the user on the display screen in or near real-time. The method may end at 438. It should be appreciated that, although the method 400 is described to be performed by the computing device associated with the user, one or more operations of the method 400 may be performed by any computing device or server, such as the server 106.

Figure 7:
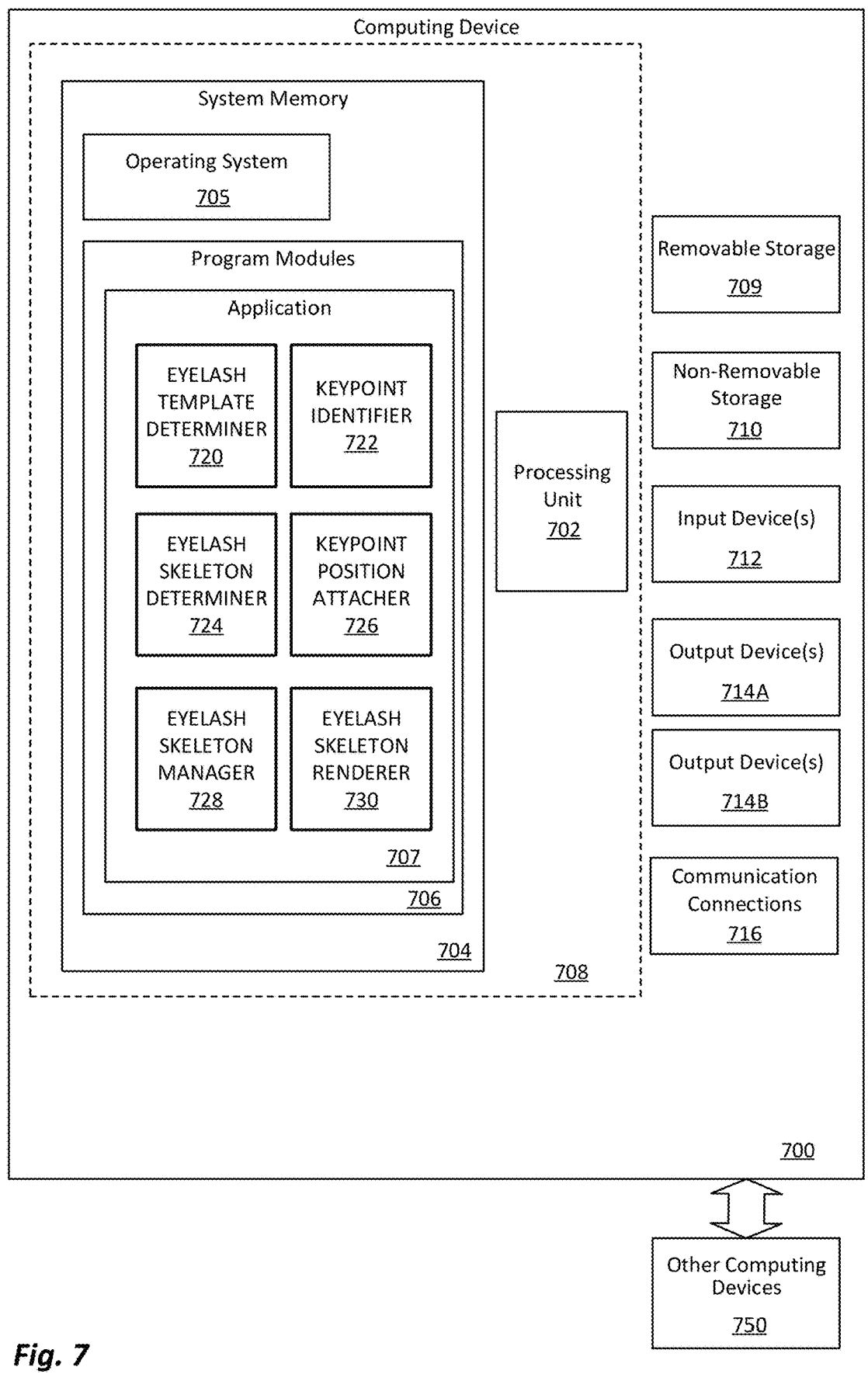
FIG. 7 depicts a block diagram illustrating physical components (e.g., hardware) of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. For example, the computing device 700 may represent the computing device 104 of FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, the program modules 706 may perform processes including, but not limited to, one or more aspects, as described herein. The application 707 includes an eyelash template determiner 720, a keypoint identifier 722, an eyelash skeleton determiner 724, a keypoint position attacher 726, an eyelash skeleton manager 728, and an eyelash skeleton renderer 730, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714A such as a display, speakers, a printer, etc. may also be included. An output 714B, corresponding to a virtual display may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
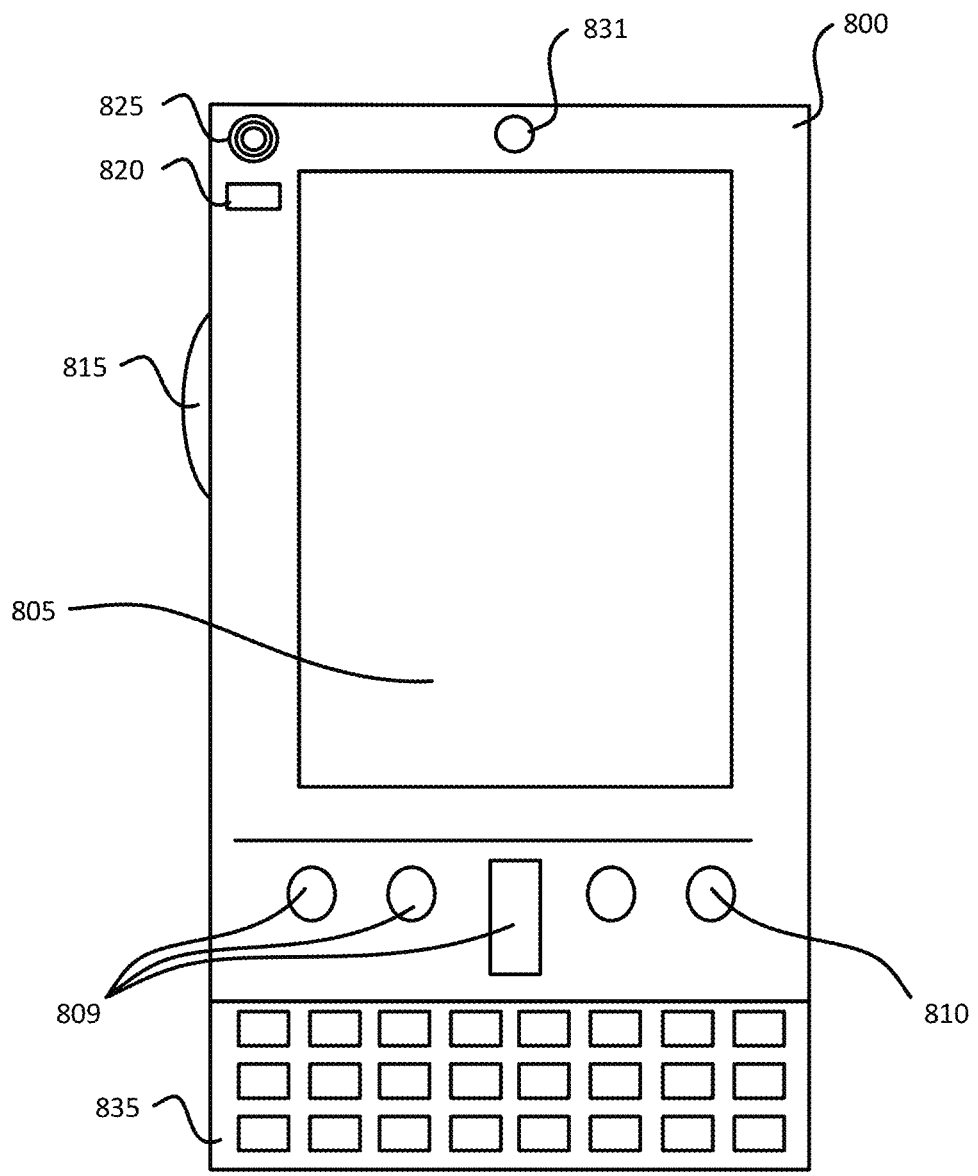
FIG. 8A illustrates a first example of a computing device with which aspects of the disclosure may be practiced.
Figure 8B:
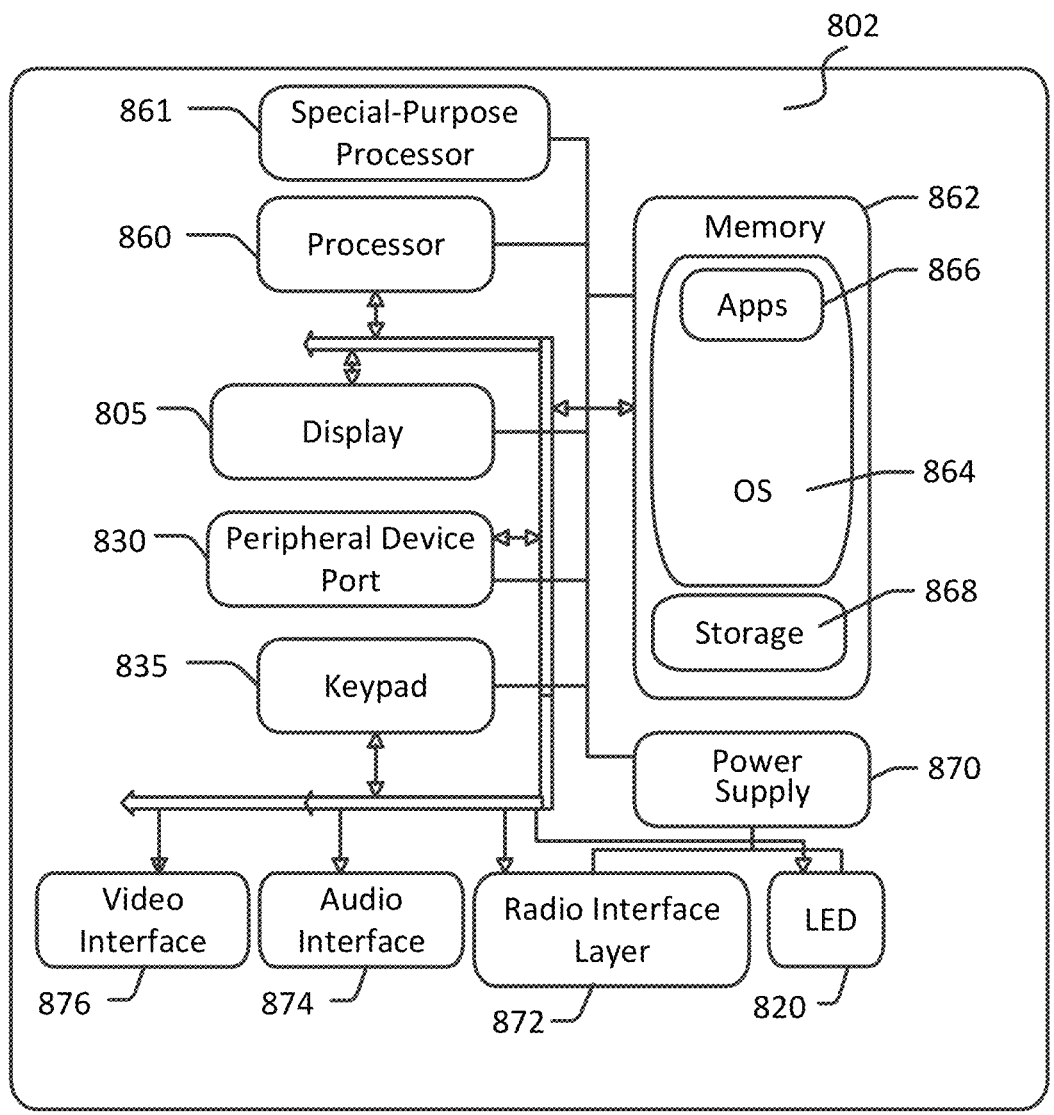
FIG. 8B illustrates a second example of a computing device with which aspects of the disclosure may be practiced.

FIGS. 8A and 8B illustrate a computing device or mobile computing device 800, for example, a mobile telephone, a smart phone, wearable computer (such as a smart watch), a tablet computer, a laptop computer, a smart home appliance, and the like, with which aspects of the disclosure may be practiced. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 809/810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 831 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports 830, such as an audio input (e.g., a microphone jack), an audio output (e.g., a headphone jack), and a video output (e.g., a HDMI port) for sending signals to or receiving signals from an external source.

FIG. 8B is a block diagram illustrating the architecture of one aspect of computing device, a server, or a mobile computing device. That is, the mobile computing device 800 can incorporate a system (802) (e.g., an architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and/or one or more components supported by the systems described herein. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g. an eyelash template determiner 720, a keypoint identifier 722, an eyelash skeleton determiner 724, a keypoint position attacher 726, an eyelash skeleton manager 728, and an eyelash skeleton renderer 730, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860/861 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
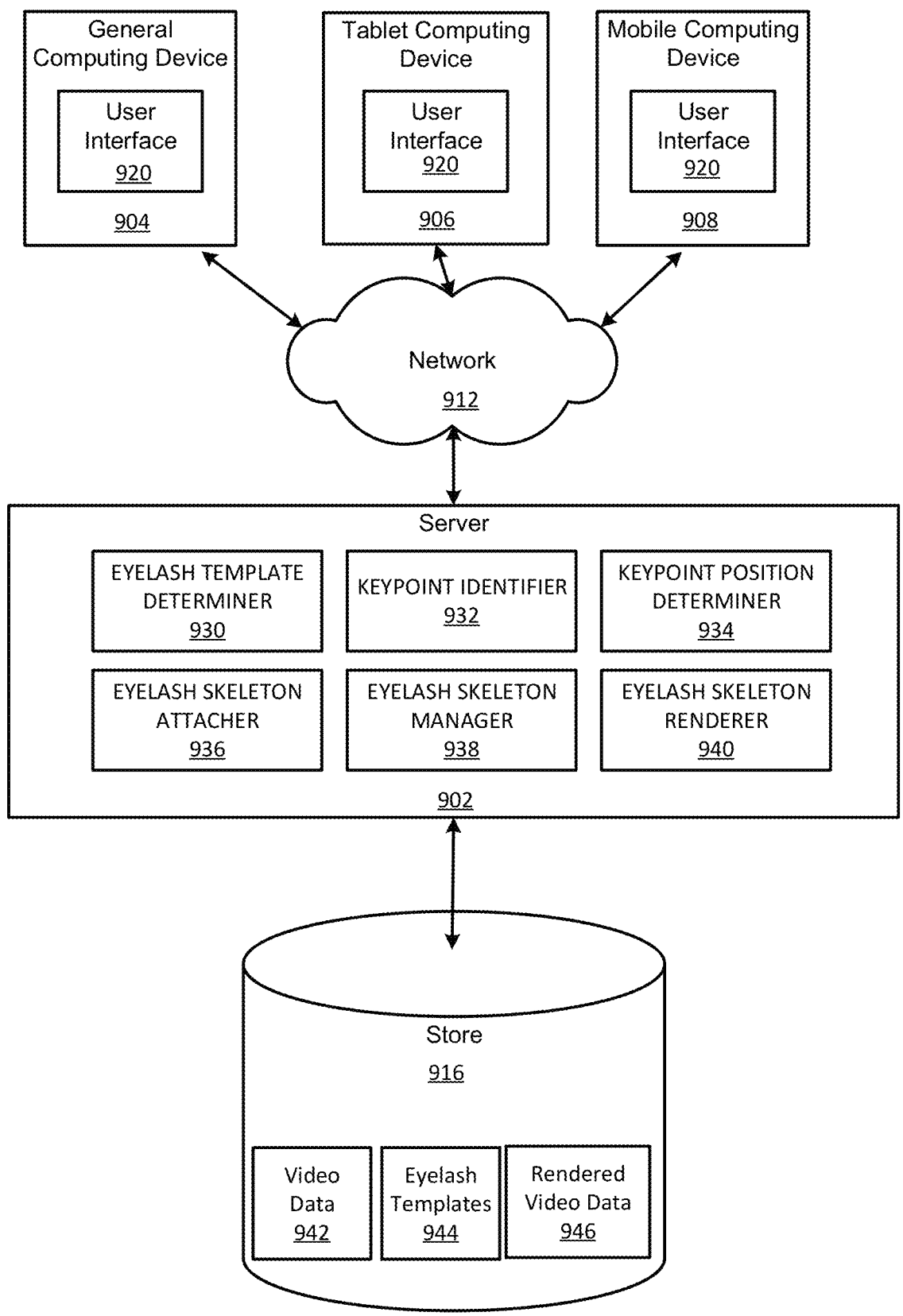
FIG. 9 illustrates at least one aspect of an architecture of a system for processing data in accordance with examples of the present disclosure.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, the computing device 904, 906, 908 may represent the computing device 104 of FIG. 1, and the server device 902 may represent the server 106 of FIG. 1.

In some aspects, one or more of an eyelash template determiner 930, a keypoint identifier 932, an eyelash skeleton determiner 934, a keypoint position attacher 936, an eyelash skeleton manager 938, and an eyelash skeleton renderer 940, may be employed by server device 902. The server device 902 may provide data to and from a client computing device such as a personal computer 904, a tablet computing device 906 and/or a mobile computing device 908 (e.g., a smart phone) through a network 912. By way of example, the computer system described above may be embodied in a personal computer 904, a tablet computing device 906 and/or a mobile computing device 908 (e.g., a smart phone). Any of these aspects of the computing devices may obtain content from the store 916, in addition to receiving graphical data useable to be either pre-processed at a graphic-originating system, or post-processed at a receiving computing system. The content store may include video data 942, eyelash templates 944, and rendered video data 946.

FIG. 9 illustrates an exemplary mobile computing device 908 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for rendering a dynamic eyelash attachment to an eye according to at least the examples provided in the sections below:

(A1) In one aspect, some examples include a method for rendering a dynamic eyelash attachment to an eye. The method may include: receiving a dynamic eyelash template selected by a user to be applied to a video, the dynamic eyelash template configuring an eyelash skeleton including eyelash skeleton branches, receiving the video with one or more video frames, identifying eye keypoints associated with a shape of the eye in each of the one or more video frames, attaching the eyelash skeleton branches to corresponding eye keypoints based on the dynamic eyelash template, setting a three-dimensional rotation of the eyelash skeleton branches to conform to the shape of the eye defined by the eye keypoints during an eye movement and adding a dynamic effect to the eyelash skeleton to allow the eyelash skeleton branches to rotate and bounce during the eye movement.

(A2) In some examples of A1, the eyelash skeleton is an augmented reality 3-dimensional eyelash skeleton.

(A3) In some examples of A1-A2, attaching the eyelash skeleton to the eye keypoints comprises attaching roots of the eyelash skeleton branches to corresponding eye keypoints based on the dynamic eyelash template.

(A4) In some examples of A1-A3, the method further includes: receiving an indication to apply the dynamic eyelash template from the user via an input device.

(A5) In some examples of A1-A4, identifying the eye keypoints associated with the shape of the eye in the at least one video frame comprises: identifying eye keypoints around the eye using a face detection algorithm, determining a 2D position of each eye keypoint in screen space, estimating a depth of each eye keypoint, and determining a 3D position of each eye keypoint based on the 2D position and the depth of each eye keypoint.

(A6) In some examples of A1-A5, the method further includes: identifying a 3D position of each eye keypoint for attaching a root of an eyelash skeleton branch; and attaching roots of eyelash skeleton branches to corresponding eye keypoints based on the dynamic eyelash template.

(A7) In some examples of A1-A6, setting a three-dimensional rotation of the eyelash skeleton branches comprises determining a blink rotation of the eyelash skeleton branches based on a distance ratio between the positions of eye keypoints.

(A8) In some examples of A1-A7, bounce includes a rebounding or reflection motion of the 3D eyelash when the 3D eyelash encounters and upper movement limit or a lower movement limit.

(A9) In some examples of A1-A8, an amount of bounce is based on one or more parameters, wherein the one or more parameters include damping, elasticity, stiffness, inertia, radius, and force.

In yet another aspect, some examples include a system including one or more processors and memory coupled to the one or more processors, the memory storing one or more instructions which when executed by the one or more processors, causes the one or more processors to perform any of the methods described herein (e.g., A1-A9 described above).

In yet another aspect, some examples include a computer-readable storage medium storing one or more programs for execution by one or more processors of a device, the one or more programs including instructions for performing any of the methods described herein (e.g., A1-A9 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for rendering a dynamic eyelash attachment to an eye, the method comprising:
   receiving a dynamic eyelash template selected by a user to be applied to a video, the dynamic eyelash template configuring an eyelash skeleton including eyelash skeleton branches;
   receiving the video with one or more video frames;
   identifying eye keypoints associated with a shape of the eye in each of the one or more video frames;
   attaching the eyelash skeleton branches to corresponding eye keypoints based on the dynamic eyelash template;

setting a three-dimensional rotation of the eyelash skeleton branches to conform to the shape of the eye defined by the eye keypoints during an eye movement; and adjusting movements of the eyelash skeleton branches based on one or more parameters, wherein the one or more parameters determine whether the eyelash skeleton branches rotate and bounce during the eye movement;

wherein setting a three-dimensional rotation of the eyelash skeleton branches comprises determining a blink rotation of the eyelash skeleton branches based on a distance ratio between the positions of eye keypoints.

2. The method of claim 1, wherein the eyelash skeleton is an augmented reality 3-dimensional (3D) eyelash skeleton.

3. The method of claim 1, wherein attaching the eyelash skeleton to the eye keypoints comprises attaching roots of the eyelash skeleton branches to corresponding eye keypoints based on the dynamic eyelash template.

4. The method of claim 1, further comprising receiving an indication to apply the dynamic eyelash template from the user via an input device.

5. The method of claim 1, wherein identifying the eye keypoints associated with the shape of the eye in the at least one video frame comprises:
identifying eye keypoints around the eye using a face detection algorithm;
determining a 2D position of each eye keypoint in screen space;
estimating a depth of each eye keypoint; and
determining a 3D position of each eye keypoint based on the 2D position and the depth of each eye keypoint.

6. The method of claim 1, further comprising:
identifying a 3D position of each eye keypoint for attaching a root of an eyelash skeleton branch; and
attaching roots of eyelash skeleton branches to corresponding eye keypoints based on the dynamic eyelash template.

7. A computing device for rendering a dynamic eyelash attachment, the computing device comprising:
a processor; and
a memory having a plurality of instructions stored thereon that, when executed by the processor, causes the computing device to:
receive a dynamic eyelash template selected by a user to be applied to a video, the dynamic eyelash template configuring an eyelash skeleton including eyelash skeleton branches;
receive the video with one or more video frames;
identify eye keypoints associated with a shape of the eye in each of the one or more video frames;
attach the eyelash skeleton branches to corresponding eye keypoints based on the dynamic eyelash template;
set a three-dimensional rotation of the eyelash skeleton branches to conform to the shape of the eye defined by the eye keypoints during an eye movement; and
adjust movements of the eyelash skeleton branches based on one or more parameters, wherein the one or more parameters determine whether the eyelash skeleton branches rotate and bounce during the eye movement;
wherein to set a three-dimensional rotation of the eyelash skeleton branches comprises to determine a blink rotation of the eyelash skeleton branches based on a distance ratio between the positions of eye keypoints.

8. The computing device of claim 7, wherein the eyelash skeleton is an augmented reality 3-dimensional (3D) eyelash skeleton.

9. The computing device of claim 7, wherein to attach the eyelash skeleton to the eye keypoints comprises to attach roots of the eyelash skeleton branches to corresponding eye keypoints based on the dynamic eyelash template.

10. The computing device of claim 7, wherein the plurality of instructions, when executed, further cause the computing device to receive an indication to apply the dynamic eyelash template from the user via an input device.

11. The computing device of claim 7, wherein to identify the eye keypoints associated with the shape of the eye in at least one video frame comprises:
identify eye keypoints around the eye using a face detection algorithm;
determine a 2D position of each eye keypoint in screen space;
estimate a depth of each eye keypoint; and
determine a 3D position of each eye keypoint based on the 2D position and the depth of each eye keypoint.

12. The computing device of claim 7, wherein the plurality of instructions, when executed, further cause the computing device to:
identify a 3D position of each eye keypoint for attaching a root of an eyelash skeleton branch; and
attach roots of eyelash skeleton branches to corresponding eye keypoints based on the dynamic eyelash template.

13. A non-transitory computer-readable medium storing instructions for rendering an dynamic eyelash attachment, the instructions when executed by one or more processors of a computing device, cause the computing device to:
receive video with one or more video frames;
identify eye keypoints associated with a shape of an eye in each of the one or more video frames;
attach eyelash skeleton branches to corresponding eye keypoints based on a dynamic eyelash template;
set a three-dimensional rotation of the eyelash skeleton branches to conform to a shape of the eye defined by the eye keypoints during an eye movement; and
adjust movements of the eyelash skeleton branches based on one or more parameters, wherein the one or more parameters determine whether the eyelash skeleton branches rotate and bounce during the eye movement;
wherein to set a three-dimensional rotation of the eyelash skeleton branches comprises to determine a blink rotation of the eyelash skeleton branches based on a distance ratio between the positions of eye keypoints.

14. The non-transitory computer-readable medium of claim 13, wherein to attach the eyelash skeleton to the eye keypoints comprises to attach roots of the eyelash skeleton branches to corresponding eye keypoints based on the dynamic eyelash template.

15. The non-transitory computer-readable medium of claim 13, wherein the instructions when executed by the one or more processors further cause the computing device to receive an indication to apply the dynamic eyelash template received from a user via an input device.

16. The non-transitory computer-readable medium of claim 13, wherein to identify the eye keypoints associated with the shape of the eye in at least one video frame comprises:
identify eye keypoints around the eye using a face detection algorithm;
determine a 2D position of each eye keypoint in screen space;
estimate a depth of each eye keypoint; and determine a 3D position of each eye keypoint based on the 2D position and the depth of each eye keypoint.

17. The non-transitory computer-readable medium of claim 13, wherein the instructions when executed by the one or more processors further cause the computing device to:
identify a 3D position of each eye keypoint for attaching a root of an eyelash skeleton branch; and
attach roots of eyelash skeleton branches to corresponding eye keypoints based on the dynamic eyelash template.

* * * * *